3,021,308
RESINOUS POLYESTERS FROM AN ALIPHATIC POLYHYDRIC ALCOHOL AND A CYCLOPENTANE POLYCARBOXYLIC ACID
Stanley W. Caywood, Jr., Swarthmore, Pa., and Frederick J. Keene, Haddon Heights, N.J., assignors to E. I. du Pont de Nemours and Company, Wilmington, Del., a corporation of Delaware
No Drawing. Filed June 15, 1959, Ser. No. 820,102
6 Claims. (Cl. 260—75)

The present invention relates to synthetic resins. More particularly, the present invention relates to alkyd-type polyester resins derived from 1,2,3,4-cyclopentanetetracarboxylic acid, 1,2,4-tricarboxy-3-carboxymethylcyclopentane, or a dianhydride of either of these acids.

Alkyd resins represent a versatile group of synthetic resins which are adaptable to the production of various types of organic coatings. The superior durability of alkyd resins has encouraged their use in exterior finishes, for example automotive finishes. As is known, alkyd resins are prepared by the reaction of polyhydric alcohols and polycarboxylic acids or their anhydrides. The most well-known alkyd resins are those which contain phthalic anhydride or maleic anhydride as their polycarboxylic acid constituents. However, alkyd resins prepared from these monoanhydrides have not always been satisfactory in selected applications. The use of compounds having a higher degree of functionality than the dicarboxylic acids would be advantageous from the point of view that such compounds would impart a high degree of reactivity and a desirable complexity to the resulting resin molecule.

Accordingly, an object of the present invention is the provision of novel polyester resins of the alkyd type. Another object of the present invention is the provision of alkyd-type polyester resins derived from tetracarboxylic acids or dianhydrides thereof. Other objects will become apparent as the invention is further described.

It has been found that the foregoing objects may be achieved when a resin is prepared from a polyhydric alcohol and 1,2,3,4-cyclopentanetetracarboxylic acid, 1,2,4-tricarboxy-3-carboxymethylcyclopentane, or a dianhydride of either of these acids.

In accordance with the present invention, polyester resins are prepared by heating a glycol, e.g., propylene glycol, with 1,2,3,4-cyclopentanetetracarboxylic acid, 1,2,4-tricarboxy-3-carboxymethylcyclopentane, or a dianhydride of either of these acids at a temperature of about 150° to 250° C. in an inert atmosphere. Oils, fatty acids, or other materials conventionally used to modify alkyd resins may be incorporated.

The following examples serve to illustrate specific embodiments of the resins and process of the present invention. However, they will be understood to be illustrative only and not as limiting the invention in any way. Parts in the examples are parts by weight.

Example 1

1,2,4-tricarboxy-3-carboxymethylcyclopentane (94.0 parts), 100 parts of propylene glycol, and 23.2 parts of adipic acid modifier were charged to a reactor. The mixture was heated at 175° C. in a nitrogen atmosphere until the acid number was about 100 (reaction time: 4 hours). A portion of the resulting resin was dissolved in a mixture of butanol and p-xylene, and the solution was applied to a steel panel. Another portion of the resin was dissolved in dilute aqueous ammonia, and the solution was applied to another steel panel. The coatings were baked at 200° C. for 0.5 hour. The coatings obtained thereby were characterized by good adhesion properties, were flexible, and showed a high resistance to impact and water.

Similar results are obtained when a resin is prepared from the dianhydride of 1,2,4-tricarboxy-3-carboxymethylcyclopentane (81 parts) and propylene glycol under the same conditions used in the foregoing experiment.

Example 2

1,2,3,4-cyclopentanetetracarboxylic dianhydride (76.0 parts), 100 parts of propylene glycol, and 23.2 parts of adipic acid modifier were charged to a reactor. The mixture was heated at 175° C. in a nitrogen atmosphere until the acid number of the product was about 100 (reaction time: 4 hours). A portion of the resin obtained was dissolved in a mixture of butanol and p-xylene, and the solution was applied to a steel test panel. Another portion of the resin was dissolved in dilute aqueous ammonia, and the solution was applied to another steel test panel. Both of the coatings were baked at 200° C. for 0.5 hour. The coatings thereby obtained had good adhesion properties and were flexible, impact-resistant, and water-resistant.

Similar results are obtained when a resin is prepared from 1,2,3,4-cyclopentanetetracarboxylic acid (89 parts) and propylene glycol under the same conditions used in the foregoing experiment.

Because of the molecular structure and high degree of functionality of the polycarboxylic acid components, the novel polyester resins of the present invention provide particularly useful coatings having superior resistance and adhesion properties. For example, the high degree of functionality of the acid component facilitates solution of the resin in aqueous ammonia. When the resultant solution is coated on a substrate, for example on a steel panel, and the coating is baked at an elevated temperature, the coating becomes water-insoluble. The degree of complexity afforded the resin by the high degree of functionality of the acid component also contributes to an improvement in other properties, such as impact resistance.

The resins of the present invention may be prepared by any one of the conventional methods used to prepare alkyd-type polyester resins. The polycarboxylic acid component may be 1,2,3,4-cyclopentanetetracarboxylic acid, 1,2,4-tricarboxy-3-carboxymethylcyclopentane, or the dianhydride derived from either of these acids. 1,2,4-tricarboxy-3-carboxymethylcyclopentane may be prepared by the process described in U.S. patent application Serial No. 685,424, filed September 23, 1957, by Robert H. Sullivan and assigned to the present assignee. Briefly, this process involves the oxidation of 5- or 6-hydroxy-5,6-dihydrodicyclopentadiene or the carboxylic acid esters thereof by aqueous nitric acid of a concentration in the range of about 30–75%.

The polyhydric alcohol used in the esterification may be any one of the alcohols which contain at least two hydroxyl groups. Examples of typical polyhydric alcohols which have been used in the preparation of alkyd resins and may be used herein are glycerol, pentaerythritol, dipentaerythritol, sorbitol, and mannitol. In addition to these polyhydric alcohols, diols may be used, such as ethylene glycol, propylene glycol, diethylene glycol, dipropylene glycol, tetraethylene glycol, etc.

The amount of polycarboxylic acid and polyhydric alcohol used in the preparation of the resins of the present invention is dependent on the properties desired in the resin. Generally, the alcohol is used in slight excess of the amount required to esterify all of the carboxyl groups in the acid. However, when the resin is destined for use in applications not demanding the resistance properties afforded by low acid number, the amount of alcohol used in the esterification may be reduced.

Minor amounts of one or more of the oils, fatty acids, or other conventional modifiers used in alkyd resin formulations to impart desirable properties to the resin may be added to the polycarboxylic acid or anhydride and polyhydric alcohol. For example, a small amount of a saturated aliphatic dicarboxylic acid such as adipic, succinic, or sebacic acid may be used to give increased flexibility for certain specific applications.

The reaction by which the resins of the present invention are prepared is effected at elevated temperatures. While the particular temperature used is not a critical factor, temperatures within the range of 150° to 250° C. have been found to give satisfactory resins in suitable reaction times. The reaction mixture ordinarily is heated until a product of a desired acid number is obtained. The acid number of the resin preferably will be below 30 in order to assure resistance to alkali. However, as in the cases exemplified, the esterification need not be carried out until the acid number is as low as 30 if the resin is to be subjected later to a treatment which will convert the free carboxyl groups to groups which are more chemically stable. Thus, as is shown in the examples, the esterification may be interrupted when an acid number as high as 100 is reached, and the resulting resin can be dissolved in aqueous ammonia, applied as a coating, and the coating baked at an elevated temperature to convert the free acid groups to imide groups. Moreover, it will be understood that the reaction time, acid number of the esterification product, and subsequent treatment, if any, of the resin are not critical features of the present invention but are dependent rather on the properties desired in the product which in turn depend on the particular use to which the resin will be put.

The invention has been described in detail in the foregoing. However, it will be apparent to those skilled in the art that many variations are possible without departure from the scope of the invention. We intend, therefore, to be limited only by the following claims.

We claim:
1. A polyester resin made by the reaction of an aliphatic polyhydric alcohol and an acidic material selected from the group consisting of 1,2,3,4-cyclopentanetetracarboxylic acid, 1,2,4-tricarboxy-3-carboxymethlylcyclopentane, and the dianhydrides of these acids.
2. The resin of claim 1, wherein the polyhydric alcohol is propylene glycol.
3. The resin of claim 1, wherein the acidic material is 1,2,3,4-cyclopentanetetracarboxylic dianhydride.
4. The resin of claim 1, wherein the acidic material is 1,2,4-tricarboxy-3-carboxymethylcyclopentane.
5. A process for the preparation of polyester resins which comprises mixing an acidic material selected from the group consisting of 1,2,3,4-cyclopentanetetracarboxylic acid, 1,2,4-tricarboxy-3-carboxymethylcyclopentane, and the dianhydrides of these acids with an aliphatic polyhydric alcohol and heating the mixture at a temperature of 150°–250° C. for the time necessary to obtain a resin of the desired acid number.
6. A process according to claim 5, wherein a saturated aliphatic dicarboxylic acid is added prior to the heating step.

References Cited in the file of this patent

UNITED STATES PATENTS

| | | |
|---|---|---|
| 2,319,576 | Agens | May 18, 1943 |
| 2,329,432 | Bruson | Sept. 14, 1943 |
| 2,437,232 | Rothrock | Mar. 2, 1948 |

OTHER REFERENCES

Ingold et al.: "Chem. Soc. Journal," Part 1, January–June (1936), page 153.